(12) United States Patent
Stantchev

(10) Patent No.: US 11,090,578 B2
(45) Date of Patent: Aug. 17, 2021

(54) PORTABLE EXTRACTION DEVICE

(71) Applicant: George Stantchev, Phoenix, AZ (US)

(72) Inventor: George Stantchev, Phoenix, AZ (US)

(*) Notice: Subject to any disclaimer, the term of this patent is extended or adjusted under 35 U.S.C. 154(b) by 0 days.

(21) Appl. No.: 16/463,055

(22) PCT Filed: Nov. 27, 2017

(86) PCT No.: PCT/US2017/063227
§ 371 (c)(1),
(2) Date: May 22, 2019

(87) PCT Pub. No.: WO2018/098410
PCT Pub. Date: May 31, 2018

(65) Prior Publication Data
US 2019/0275443 A1 Sep. 12, 2019

Related U.S. Application Data

(60) Provisional application No. 62/426,482, filed on Nov. 26, 2016.

(51) Int. Cl.
*B01D 11/02* (2006.01)
*B01D 11/04* (2006.01)
(Continued)

(52) U.S. Cl.
CPC ...... *B01D 11/0296* (2013.01); *B01D 11/0207* (2013.01); *B01D 11/0238* (2013.01);
(Continued)

(58) Field of Classification Search
CPC ...... B01D 11/02–0257; B01D 11/0219; B01D 11/0273; B01D 11/0292; B01D 11/0296;
(Continued)

(56) References Cited

U.S. PATENT DOCUMENTS 1,802,533 A * 4/1931 Reid ............... B01D 11/0203
554/16
4,735,782 A * 4/1988 Wicker ............ B01D 11/0219
422/275

(Continued)

FOREIGN PATENT DOCUMENTS

GB         2393720 A  *  4/2004  ............ A23L 27/14
WO  WO-2009138818 A1 * 11/2009  ............ B01D 5/006

*Primary Examiner* — Jonathan Luke Pilcher
(74) *Attorney, Agent, or Firm* — Rosenberg, Klein & Lee

(57) ABSTRACT

The present invention provides a portable extraction device for extracting at least one constituent from a substance by an extraction fluid. The extraction device comprises at least one pump, an extractor, an evaporator, and a condenser. The substance and the extraction fluid are placed and mixed in the extractor. The extraction fluid is a subcritical fluid. The constituent in the substance will be dissolved in the extraction fluid under a predetermined pressure and temperature. The evaporator receives the extraction fluid including the constituent from the extractor, and heats the extraction fluid including the constituent to gasify the extraction fluid and separate the constituent from the gasified extraction fluid. The condenser receives the gasified extraction fluid via a first pipe, liquefies the gasified extraction fluid, and transmits the liquefied extraction fluid to the extractor via a second pipe. The extractor, the evaporator, and the condenser are operated under constant pressure.

2 Claims, 7 Drawing Sheets

(51) Int. Cl.
*B01D 5/00* (2006.01)
*B01D 1/28* (2006.01)
*B01D 3/10* (2006.01)

(52) U.S. Cl.
CPC ............ *B01D 11/0484* (2013.01); *B01D 1/28* (2013.01); *B01D 3/10* (2013.01); *B01D 5/006* (2013.01); *B01D 5/0057* (2013.01)

(58) Field of Classification Search
CPC ...... B01D 1/28; B01D 5/0042; B01D 5/0057; B01D 5/006; B01D 5/0063; B01D 5/0066; C02F 1/04–18
See application file for complete search history.

(56) References Cited

U.S. PATENT DOCUMENTS

| | | | | |
|---|---|---|---|---|
| 5,325,765 | A * | 7/1994 | Sylvan | A47J 31/0673 |
| | | | | 426/433 |
| 5,447,077 | A * | 9/1995 | Lautenschlager | B01D 1/0017 |
| | | | | 73/863.11 |
| 6,589,422 | B2 * | 7/2003 | Low | B01D 17/0208 |
| | | | | 210/259 |
| 7,002,029 | B2 * | 2/2006 | Davis | B01D 11/0203 |
| | | | | 554/16 |
| 2002/0182722 | A1 * | 12/2002 | Corr | B01D 3/40 |
| | | | | 435/309.1 |
| 2004/0147769 | A1 * | 7/2004 | Davis | B01D 11/028 |
| | | | | 554/9 |
| 2016/0122685 | A1 * | 5/2016 | Martinsen | B01D 11/0215 |
| | | | | 554/8 |

* cited by examiner

PORTABLE EXTRACTION DEVICE

This application is a National-Stage Application of PCT/US2017/063227 filed Nov. 27, 2017 which claims priority on U.S. Provisional Application No. 62/426,482 filed Nov. 26, 2016, the entire contents of which are incorporated herein by reference.

FIELD OF THE INVENTION

The present invention relates to a portable extraction device, particularly to a portable extraction device capable of extracting at least one constituent from a substance by an extraction fluid constituted by a subcritical fluid.

BACKGROUND

Currently, supercritical fluids are usually used in existed extraction equipment and method, but supercritical liquefied gases need to be operated under relative high pressure. For example, the supercritical pressure used with $CO_2$ is above 7.3 MPa, and the subcritical pressure used for example with tetrafluroethane is around 0.6 MPa. Therefore, supercritical fluid equipment requires high capital investment for pressurized equipment. Although a volatile solvent as tetrafluoretaine in subcritical pressure behaves as CO2 in a supercritical pressure. Similar results may be obtained by utilizing non-volatile solvents as alcohols, methanol, ethanol, etc.

In the extraction process, subcritical fluid compared to the supercritical fluid is operating under significantly lower pressure and low temperature conditions. The use of subcritical fluids with given kinetics offers certain advantages to the extraction process and the equipment design compared with highly pressurized liquids in their supercritical state. Selecting a subcritical fluid with low viscosity and a high diffusity will lead to high extraction kinetics. Under those conditions, the extraction of subcritical fluid can be used to replace the extraction of supercritical fluid, thereby allowing engineers to exploit the typical subcritical benefits at more reasonable costs.

SUMMARY

It is one objective of the present invention to provide a portable extraction device, in which at least one constituted of a substance can be extracted under a relatively low pressure with a subcritical fluid, and users can perform the extraction process with reasonable costs.

For achieving above objective, the present invention provides a portable extraction device, which comprises an extractor, an evaporator, a temperature adjusting element, a pump and a condenser. The extractor is for placing and mixing the substance and the extraction fluid, the constituent in the substance will be dissolved into the extraction fluid under a predetermined pressure and a predetermined temperature. The evaporator receives the extraction fluid including the constituent from the extractor, and heats the extraction fluid including the constituent so as to vaporize the extraction fluid and therefore separate the constituent from the vaporized extraction fluid. The condenser receives the vaporized extraction fluid from the evaporator via first pipe, liquefies the extraction fluid, and transmits the liquefied extraction fluid to the extractor via second pipe. The pump is evacuating the gases from the evaporator and liquifies them in the condenser. Accordingly the extractor, the evaporator, the temperature adjusting element, the pump and the condenser can be built as a single column so as to facilitate the user to carry the extraction device.

It is one objective of the present invention to provide a portable extraction device, in which the extractor, the evaporator, and the condenser are operated under a constant pressure.

It is one objective of the present invention to provide a portable extraction device, in which one can execute multiple stages of separation processes to allow the extraction fluid and the constituent to be completely separated.

DETAILED DESCRIPTION OF THE PREFERRED EMBODIMENTS

Figure 1:
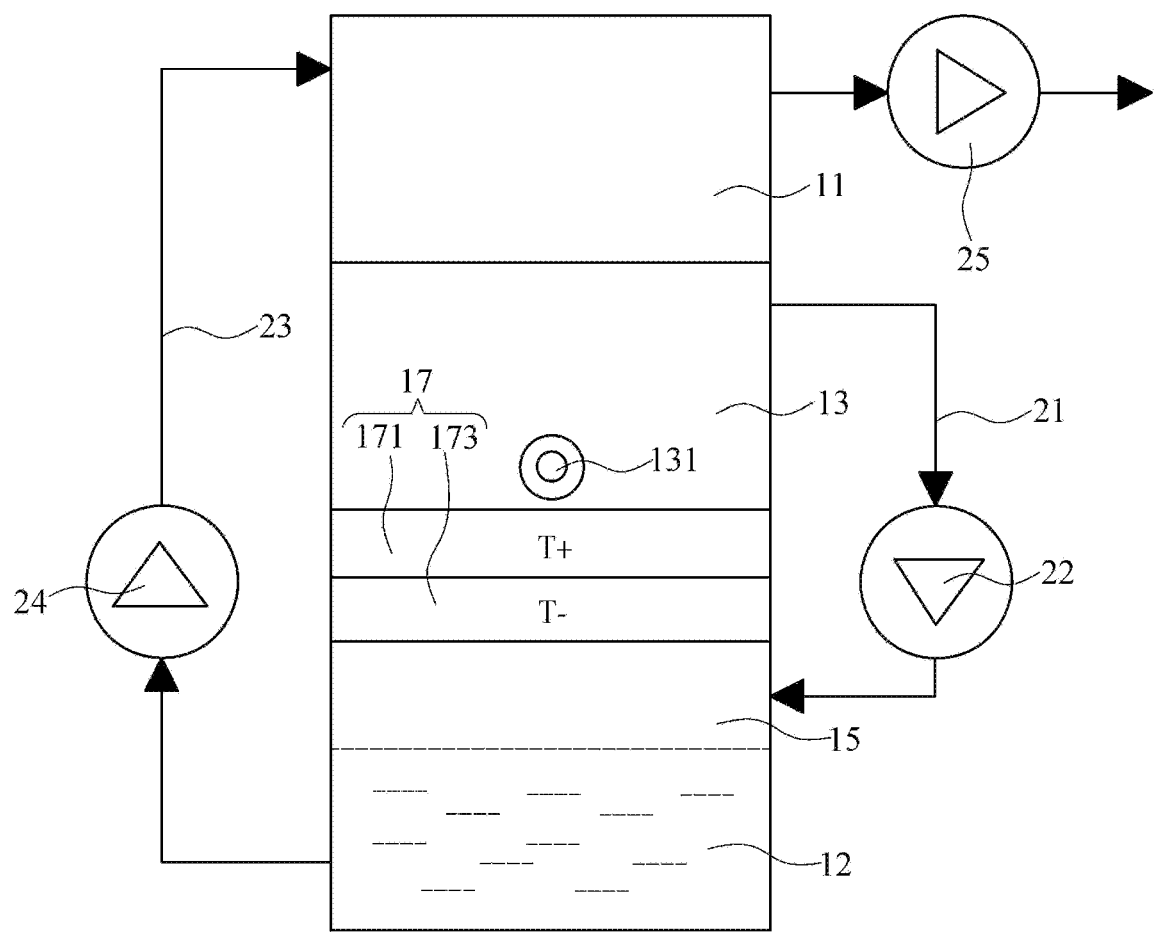
FIG. 1 is a block diagram of a portable extraction device according to the first embodiment of the present invention.

Referring to FIG. 1, there is shown a block diagram of a portable extraction device according to a first embodiment of this invention. The portable extraction device 100 of the present embodiment is able to extract at least one constituent from a substance by an extraction fluid. As shown in FIG. 1, the portable extraction device 100 comprises an extractor 11, an evaporator 13, and a condenser 15. The substance and the extraction fluid are placed in the extractor 11. The extraction fluid is a fluid in a subcritical state, and can be any volatile non toxic solvent, for example, R-134a, ethanol, etc.

A subcritical fluid (or a fluid in subcritical state) is a liquefied gas, which is obtained by increasing pressure to let gas passes into liquefied existence when the temperature of the gas is higher than boiling point and less than critical point. Applying a subcritical fluid to an extraction fluid offers the advantages that the extraction device 100 and the extraction process can operate under relatively low pressure compared with a highly pressurized liquefied in its supercritical state.

The substance and the extraction fluid are mixed in the extractor 11. Under a predetermined pressure (P) and a predetermined temperature (T), the extraction fluid is circulated in the extractor 11 in order to dissolve the constituent in the substance. The evaporator 13 is provided below the extractor 11, and interconnected to the extractor 11. The extraction fluid including the constituent flows down from the extractor 11 to the evaporator 13 via one or more openings or pipes between the extractor 11 and the evaporator 13. After the evaporator 13 receives the extraction fluid including the constituent from the extractor 11, it will heat the extraction fluid at a temperature Ta above the predetermined temperature (T), so that the extraction fluid becomes a gas, and therefore the constituent can be separated from the vaporized extraction fluid.

The condenser 15 is connected to an upper part of the evaporator 13 via a first pipe 21, and connected to the extractor 11 via a second pipe 23. The condenser 15 is provided below the extractor 11 and the evaporator 13. The condenser 15 receives the vaporized extraction fluid from the evaporator 13 via the first pipe 21. The condenser 15 can liquefy the vaporized extraction fluid by a cooling process, such that the extraction fluid 12 will liquify in the condenser 15. Afterwards, the liquefied extraction fluid 12 will be transmitted to the extractor 11 via the second pipe 23.

In one embodiment of the present invention, a first circulation pump 22 is located at the first pipe 21, and a second circulation pump 24 is located at the second pipe 23. The first circulation pump 22 is a gas phase pump, and the second circulation pump 24 is a liquid phase pump. The vaporized extraction fluid is captured and collected in the condenser 15 by the first circulation pump 22. The liquefied extraction fluid 12 in the condenser 15 is pumped to the extractor 11 by the second circulation pump 24.

The first circulation pump 22 has a dual function. One function of the first circulation pump 22 is able to create a vacuum or reduce the working pressure during the evaporation process which speeds up the evaporation of the extraction fluid. The other function of the first circulation pump 22 is able to create a higher pressures in the condenser so as to help the liquification of the extraction fluid during the condensation process. Furthermore, the second circulation pump 24 also has a dual function. One function of the second circulation pump 24 is to pump the liquefied extraction fluid 12 from the condenser 15 to the extractor 11 before the next extraction process, and the second function it is to create pressure in the extractor 11 by pumping more liquefied extraction fluid 12 into the extractor 11.

The portable extraction device 100 further comprises a temperature adjusting element 17 disposed between the evaporator 13 and the condenser 15. The temperature adjusting element 17 is a combined heating and cooling circuit, for example, Peltier element. The temperature adjusting element 17 comprises a hot surface 171 and a cold surface 173. The hot surface 171 is attached to the evaporator 13 and used for heating the extraction fluid in the evaporator 13 and transforming it from a liquid state to a gas state. The cold surface 173 is attached to the condenser 15 and is used for cooling the extraction fluid in the condenser 15 and transfroming it from a gas state to a liquid state.

Besides, the evaporator 13 is provided at it lower side thereof with a drainage pipe 131. In one embodiment of the present invention, the constituent extracted, from the substance, by the portable extraction device 100 may be in a liquid phase. Therefore, the extracted constituent is drained from the drainage pipe 131 from the evaporator 13 to a collector (not shown).

In one embodiment of this invention, the extractor 11, the evaporator 13, and the condenser 15 are operated under constant pressure. This is the major difference between subcritical fluid extraction system and supercritical fluid extraction system. Under supercritical extraction, the pressure is changed in order to evaporate the fluid and separate the constituent (or constituents).

In one embodiment of this invention, the extractor 11 and the evaporator 13 may be opened or designed as demountable containers, therefore they may be exposed to air after the completion of the extraction process, in this regard, the extractor 11 is able to be connected to a vacuum pump 25, which is used for eliminating the residual air in the extractor 11 and the evaporator 13 before the next extraction cycle.

The extraction device 100 can perform multiple stages of separation process and multiple stages of liquification process. The multiple stages of separation allows the extraction fluid and the constituent to be completely separated. The multiple stages of liquification guarantees that the extraction fluid will be recovered from gas phase to liquid phase, and stored in the condenser 15. There is theoretically no loss of extraction fluid in the extraction process.

Figure 2:
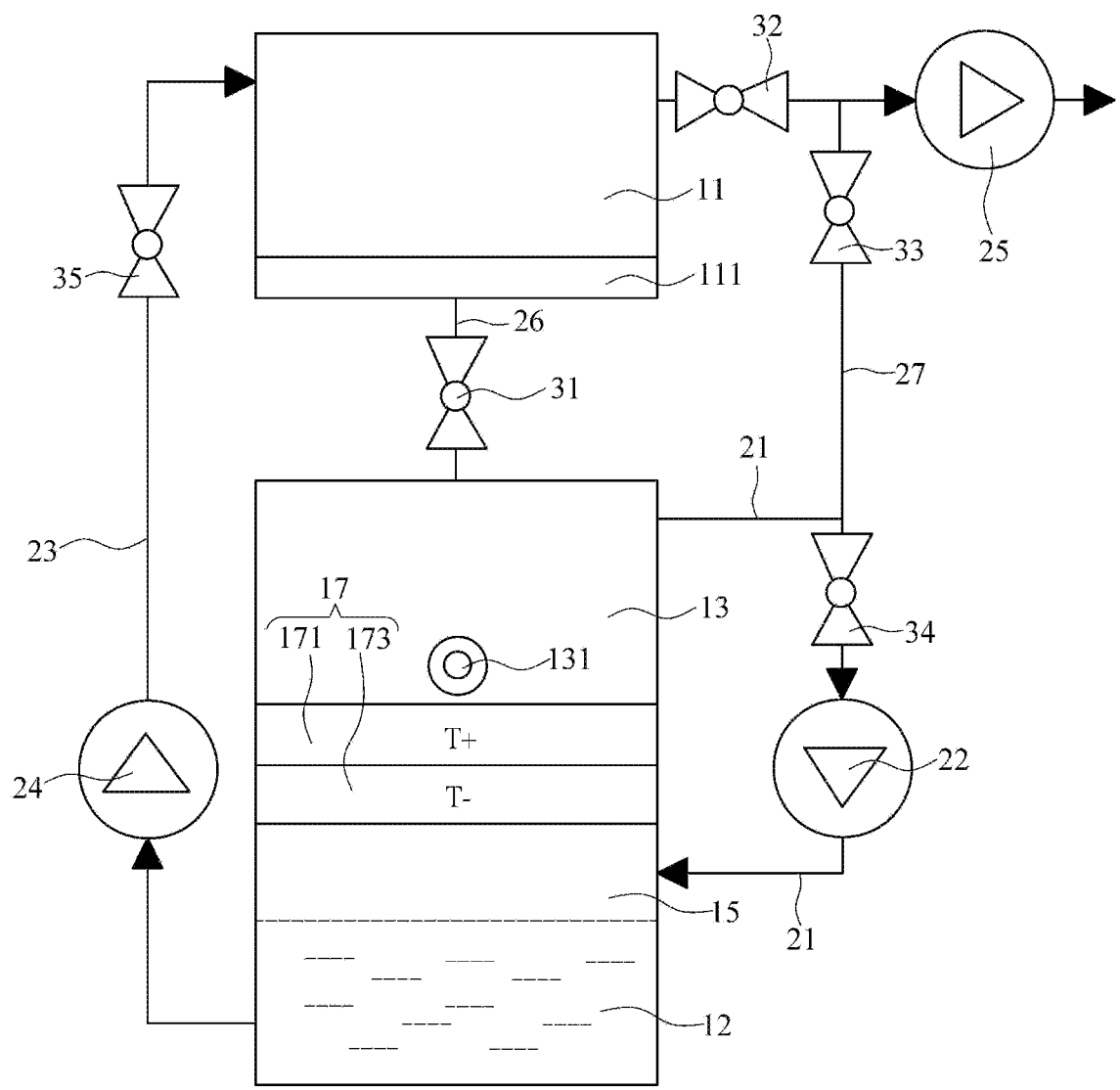
FIG. 2 is a block diagram of a portable extraction device according to the second embodiment of the present invention.

Referring to FIG. 2, there is a block diagram of a portable extraction device according to the second embodiment of this invention. The portable extraction device 101 of the present embodiment compared to the portable extraction device 100 of the above embodiment further comprises a plurality of vessels. The extractor 11, the evaporator 13, and/or the condenser 15 are connected by multiple valve configurations.

As shown at FIG. 2, a first valve 31 is located at a third pipe 26 between the extractor 11 and the evaporator 13. A second valve 32 and a third valve 33 are located at a bypass pipe 27 between the extractor 11, the vacuum pump 25, and the first pipe 21. A fourth valve 34 is located at the first pipe 21, and a fifth valve 35 is located at the second pipe 23. The vacuum pump 25 is connected to the extractor 11 via the second valve 32, and to the evaporator via the first pipe 21 via the third valve 33.

When the portable extraction device 101 starts a vacuum process, the valves 31 and 32 will be opened, the valves 33, 34, and 35 will be closed, such that the inside space of the extractor 11 and the evaporator 13 are interconnected, the first pipe 21 between the evaporator 13 and the condenser 15 is closed. Sequentially, the vacuum pump 25 performs a vacuum process for the extractor 11 and the evaporator 13 to eliminate the air in the extractor 11 and the evaporator 13. When the vacuum process is completed, the valve 34 at the first pipe 21 and the valve 35 will be opened, and the valve 32 will be closed. In another embodiment of the present invention, the first circulation pump 22 may be used as a vacuum pump instead pump 25 with the configurations of proper valves.

When the portable extraction device 101 starts an extraction process, the fifth valve 35 will be opened, the second circulation pump 24 pumps the liquefied extraction fluid 12 from the condenser 15 to the extractor 11 via the second pipe 23 until the extractor 11 is filled with the liquefied extraction fluid 12, and a desired pressure is created when the valves 31, 32, 33, and 34 are closed. When the desired pressure is achieved, the operation of the second circulation pump 24 will be stopped, the fifth valve 35 will be closed. In one embodiment of the present invention, the portable extraction device 101 may be without the second circulation pump 24, the liquefied extraction fluid 12 in the condenser 15 can be relocated to the extractor 11 via the pressure created from the first circulation pump 22.

After the substance is soaked in the extraction fluid and time has reached the soaking time threshold, the first valve 31 between the extractor 11 and the evaporator 13 will be opened, the extraction fluid including the constituent will flow down to the evaporator 13 via the third pipe 26. When the extraction fluid including the constituent has drained to the evaporator 13, the portable extraction device 101 will start an evaporation process. In the evaporation and condensation process, the first valve 31 will be closed, the temperature adjusting element 17 is turned on, the liquefied extraction fluid in the evaporator 13 will be heated by the temperature adjusting element 17 into the gas state, and the first circulation pump 22 evacuates the vaporized extraction fluid from the evaporator 13 to the condenser 15. The vaporized extraction fluid is condensing in the condenser 15 due to the overpressure created by the first circulation pump 22 and the cooling generated from the temperature adjusting element 17. If the extraction process is continuous circulation, the first valve 31 does not need to be closed, so that new extraction fluid including the constituent is allowed to enter the evaporator 13, continuously.

When all the solvent, for example, the extraction fluid, has evaporated and the extracted constituent remains in the evaporator 13, the portable extraction device 101 may start a draining process. In the extracted constituent draining process, the fourth valve 34 and the fifth valve 35 are closed, the extracted constituent can be drained via the drainage pipe 131. In another embodiment of the present invention, otherwise, the extractor 11 and the evaporator 13 may be disassembled, the extracted constituent can be taken out when the evaporator 13 is disassembled from the portable extraction device 101. During operation of the portable extraction device the vacuum process, the extraction process, the evaporation and condensation process, and the draining process need to be repeated multiple times before the substance is removed from the extractor 11.

After the extraction of the constituent in the substance has completed, the pressure in the extractor 11 will be lowered when the extraction fluid is evaporated and the first valve 31 is opened to equalize pressure, such that the extractor 11 may be opened. In one embodiment of the present invention, the extractor 11 further includes a heating element 111, for example, electric heating filament, which can used for evaporating the remaining residual extraction fluid on the substance. The remaining residual extraction fluid on the substance will be evaporated by the heating element 111 heating the extractor 11, the valves 32 and 33 in the bypass pipe 27 are opened so as to evacuate the vapor in the extractor 11 by the first circulation pump 22. In another embodiment of the present invention, a heated gas circulation will be provided to the extractor 11 through the first circulation pump 22, the first pipe 21, the valve 34, the evaporator 13, and the first valve 31 in order to evaporate the remaining residual extraction fluid on the substance. After the remaining residual extraction fluid has evaporated, the extractor 11 and the evaporator 13 will be opened, the extractor 11 may be disassembled from the evaporator 13, and the evaporator 13 may be removed as a complete unit with the extract.

Figure 3:
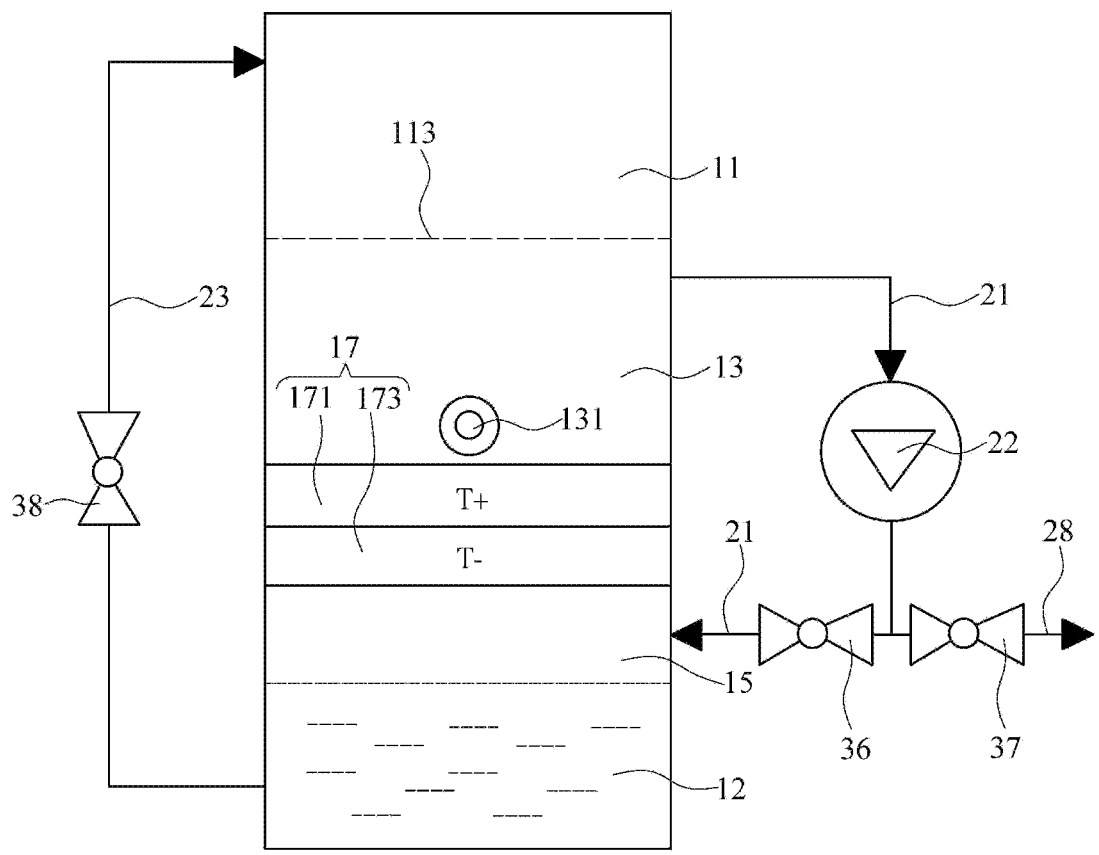
FIG. 3 is a block diagram of a portable extraction device according to the third embodiment of the present invention.

Referring to FIG. 3, there is shown a block diagram of a portable extraction device according to the third embodiment of this invention. The portable extraction device 102 of the present embodiment compared to the portable extraction device 100 of the above embodiment is without the second circulation pump (24) and the vacuum pump (25), and further comprises a first valve 36, a second valve 37, a third valve 38, and a mesh 113. The first valve 36 is located at the first pipe 21. The second valve 37 is located at an outside pipe 28 connected with the first pipe 21. The third valve 38 is located at the second pipe 23. The mesh 113 is located between the extractor 11 and the evaporator 13.

In the present invention, the first circulation pump 22 evacuates the vaporized extraction fluid from the evaporator 13 to the condenser 15 through the first valve 36. An overpressure created by the pumping action of the first circulation pump 22 will relocate the liquefied extraction fluid 12 from the condenser 15 to the extractor 11 through the third valve 38. The extraction fluid including the constituent flows down from the extractor 11 to the evaporator 13 via the mesh wall 113.

The first circulation pump 22 has a dual function. The first circulation pump 22 can be used for vacuuming the extractor 11 and the evaporator 13 via the first pipe 21, the outside pipe 28, and the second valve 37, or used for circulating the vapor, for example, the vaporzed extraction fluid, via the first pipe 21 and the first valve 36. When the first circulation pump 22 performs a vacuuming process, the first valve 36 and the third valve 38 are closed, the second valve 37 is opened. When the first circulation pump 22 performs an extraction process, the first valve 36 and the third valve 38 are opened, the second valve 37 is closed.

After the extraction of the constituent has completed, the third valve 38 will be closed, the first circulation pump 22 continues to operate until the residual extraction fluid is fully removed from the substance in the extractor 11. Afterwards, the extractor 11 and the evaporator 13 will be opened to remove the original substance and place a new substance to be extracted, and take out the constituent from the evaporator 13.

In the portable extraction device 100, 101, or 102, the extractor 11 and the evaporator 13 may be designed as cartridge or vessel in various configuration for easy disassemble. Accordingly, if the extractor 11 and the evaporator 13 are designed to be disassembled, the evaporator 13 doesn't need to be furnished with drainage pipe 131.

Figure 4:
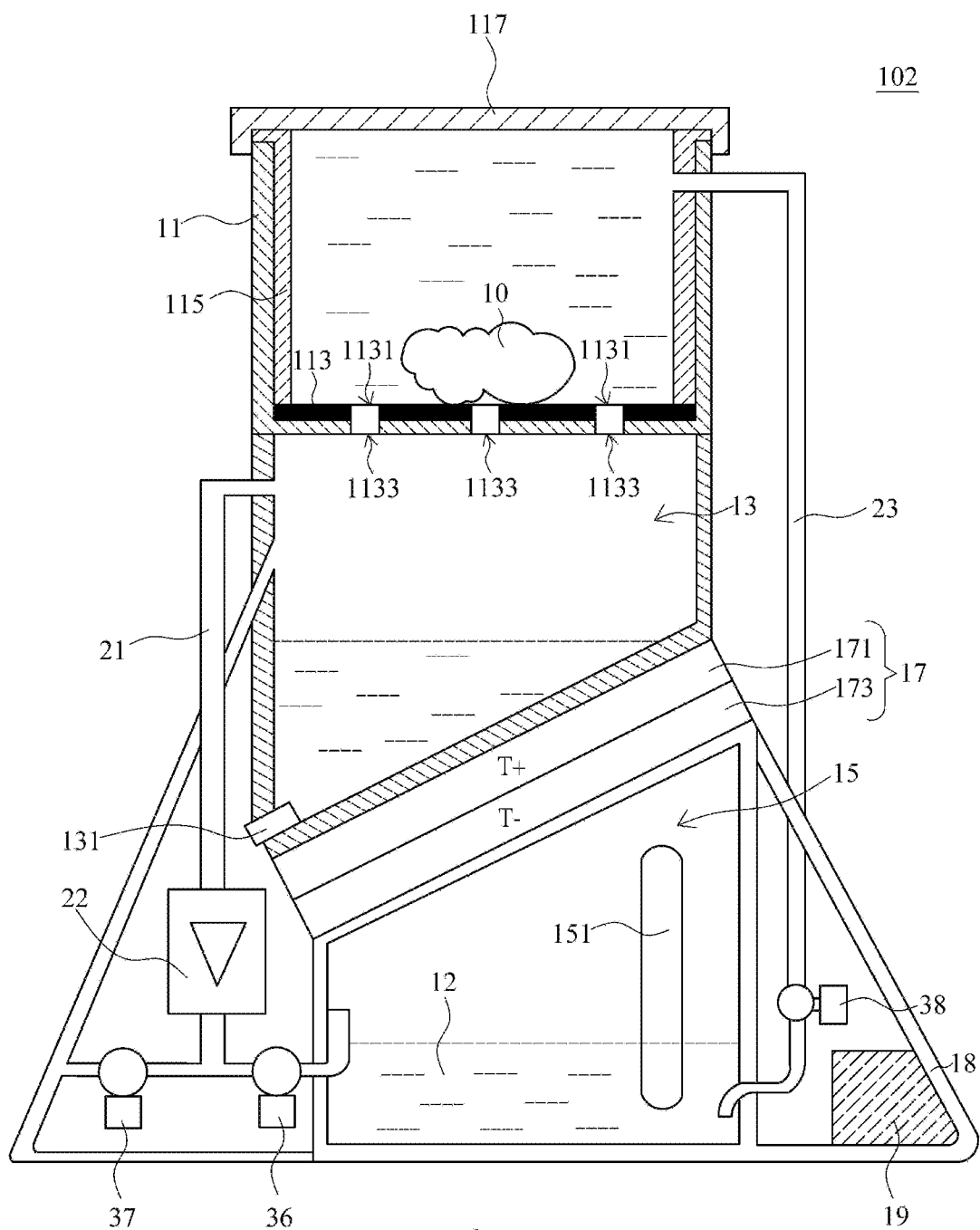
FIG. 4 is a construction diagram of a portable extraction device according to the third embodiment of the present invention.

Referring to FIG. 4, there is shown a construction diagram of a portable extraction device according to the third embodiment of this invention, as well as referring with FIG. 3 together. As shown in FIGS. 3 and 4, the extractor 11 of the portable extraction device 102 further comprises a vessel 115 and a lid 117. The vessel 115 can disassemble from the extractor 11. The substance 10 to be extracted is present in the extractor 11 via the vessel 115 covered by the lid 117.

The liquefied extraction fluid 12 enters the extractor 11 through the second pipe 23 with pressure around 3-8 bars, gets in contact with the substance 10, and then the miscella, the extraction fluid including the constituent, enters the evaporator 13. Wherein the miscella is heated by the temperature adjusting element 17, and therefore the extraction fluid in the miscella is evaporated and separated from the constituent before the constituent is drained via the drainage pipe 131.

The vaporzed extraction fluid, via the first circulation pump 22, leaves the evaporator 13 and enters the condenser 15. In the condenser 15, the vaporized extraction fluid is condensed to a liquid form 12 by the higher pressure and the cooling from the temperature adjusting element 17. The temperature adjusting element 17 is a heating and cooling circuit, for example, Peltier element, which can be provided heating (T+) at one surface 171 thereof, and provided cooling (T−) at another surface thereof. The cooled extraction fluid 12 is pressurized and fed to the extractor 11 for recirculation via the second pipe 23.

Figure 5A:
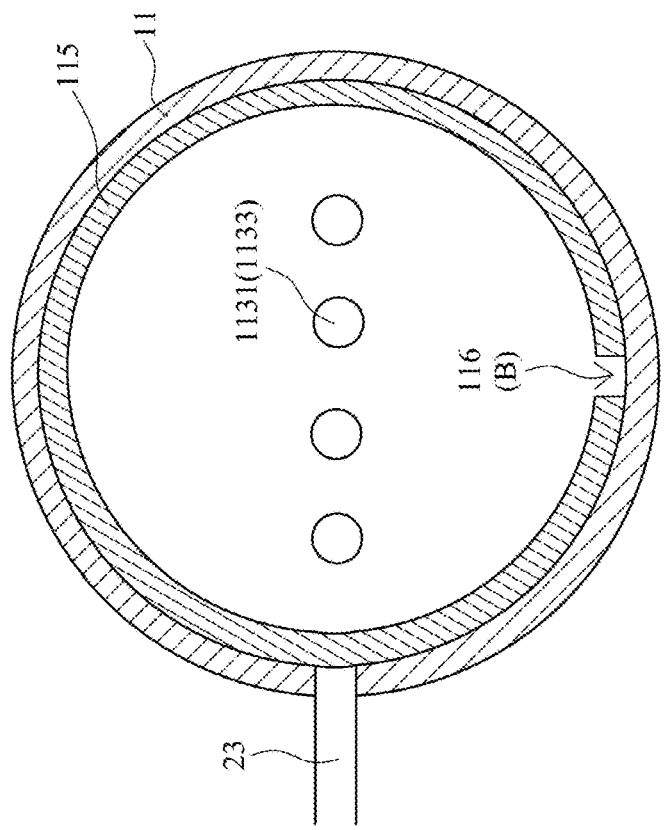
FIG. 5A is a view of a liquefied inlet of a vessel of a extractor 11 located in a first position according to the present invention.
Figure 5B:
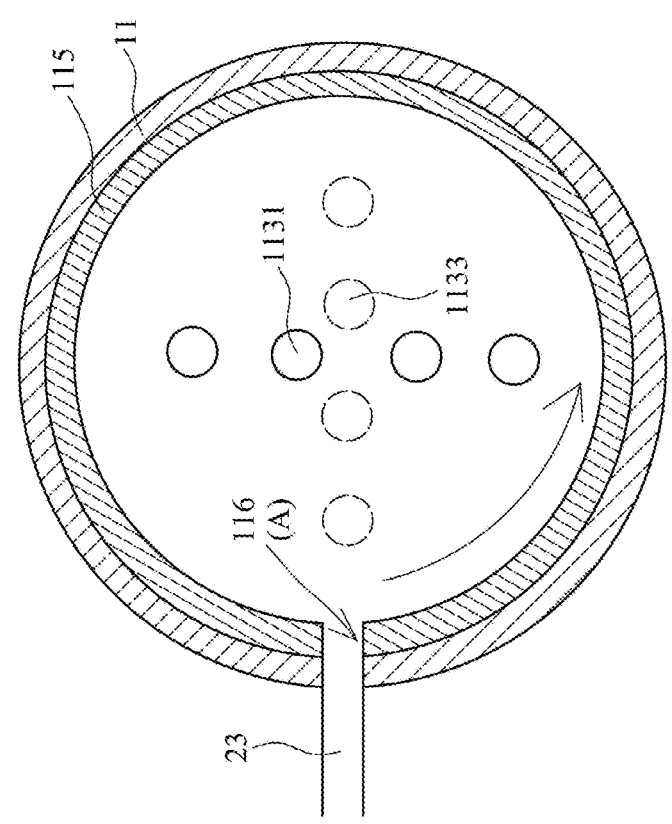
FIG. 5B is a view of a liquefied inlet of a vessel of a extractor 11 located in a second position according to the present invention.

In one embodiment of the present invention, the vessel 115 is a vessel capable of rotating, and opens the inlet 116 for liquefied solvent. As shown in FIG. 5A, when the inlet 116 is located in a first position A by the rotation of the vessel 115, the inlet 116 is aligned with the second pipe 23, the liquefied extraction fluid 12 enters the vessel 115 via the second pipe 23 and the inlet 116, and soaks the substance 10. There are openings 1131, 1133 on the bottom of vessel 115 and extractor 11, respectively. In the first position A, the inlet 116 is open, the openings 1131, 1133 are not aligned and therefore are closed. As shown at FIG. 5B, after the soaking time passes, for example, 15 minutes, the soaking ends and the inlet 116 will be disconnected from the second pipe 23 when the inlet 116 is located in a second position B by rotating the vessel 115, the second pipe 23 is closed by the side wall of the vessel 115. In the second position B, the inlet 116 is closed, the openings 1131, 1133 are aligned with each other and therefore are opened, the liquified solvent with constituent passes through openings 1131, 1133 and enters the evaporator 13. Afterwards, the extraction fluid including the constituent flows down from the extractor 11 to the evaporator 13 via the openings 1131, 1133 of the mesh 113 at the bottom of the vessel 115.

In continuous extraction mode, by rotating the inlet 116 from the first position A to the second position B, the incoming extraction fluid 12 via the second pipe 23 may be limited; furthermore, the second pipe 23 may be closed by the side wall of the vessel 115 when the extraction process is completed and the extraction fluid needs to be evacuated. The second pipe 23 accesses the extraction fluid 12 below its level in the condenser 15 and through the third valve 38 feeds it to the extractor 11.

The portable extraction device 102 further comprises a controller electronic circuit 19 located within an enclosed column 18. The controller electronic circuit 19 is electrically connected to each of valves, each of pumps, and the temperature adjusting element 17, and used for controlling the operation of the valves, the pumps, and the temperature adjusting element 17.

The first circulation pump 22 can create a lower pressure in the evaporator 13, and compresses the extraction fluid 12 to liquefy in the condenser 15. Besides, the condenser 15 may be equipped with a sight glass 151 for showing the level of the liquefied extraction fluid 12 and marks for high and low level may be present at the sight glass 151. If the level of the liquefied extraction fluid 12 observed by the sight glass 151 is lower, such that the liquefied extraction fluid 12 can be re-filled to the portable extraction device 102. The extract, for example, the constituent, is drained after the evaporation is finished from the drainage pipe 131. Drainage pipe 131 may be equipped with a locking element, for example, valve or a self locking element, for opening or closing the drainage pipe 131. The first pipe 21 evacuates the vaporized extraction fluid from the evaporator 13 via the first circulation pump 22 to the upper side of the condenser 15 above the level of the liquefied extraction fluid 12.

The portable extraction device 102 of the present embodiment compared to the portable extraction device 101 of the above embodiment reduces the number of the valves, for example, the valves (31), (34), and (35) may not be installed, in such a way that the size of the portable extraction device 102 can be effectively minimized. The first circulation pump 22 and the valve 37 can be used for vacuuming the inside vessels of the extractor 11 and the evaporator 13.

When the lid 117 is opened, the vessel 115 can be removed from the extractor 11, such that the vessel 115, the evaporator 13, and the drainage pipe 131 can allow cleaning. Cleaning may be performed with volatile or non-volatile solvent as freon, alcohol, etc. washing the vessel 115, the evaporator 13, and the drainage pipe 131. In the present embodiment, the original substance 10 in the extractor 11 can be changed by replacing a new vessel 115 having a new substance 10, or by opening the lid 117, removing the original substance 10 from the vessel 115 and placing a new substance 10 into the vessel 115.

In the main embodiment of the present invention, the extractor 11, the evaporator 13, the temperature adjusting element 17, the condenser 15, and the first circulation pump 22 are built as sections within a single column, respectively. Wherein the column has the lid 117 that after opening it allows to access each of sections of the column.

In the portable extraction device 102 of the present embodiment, the evaporator 13 is provided on the temperature adjusting element 17 arranged at an angle, and the drainage pipe 131 is provided at the lower side of the evaporator 13, in such a way that the extract is easy drained from the drainage pipe 131, and in the configurations of which the first circulation pump 22 may be easier mounted under the temperature adjusting element 17 to conserve space.

Figure 6:
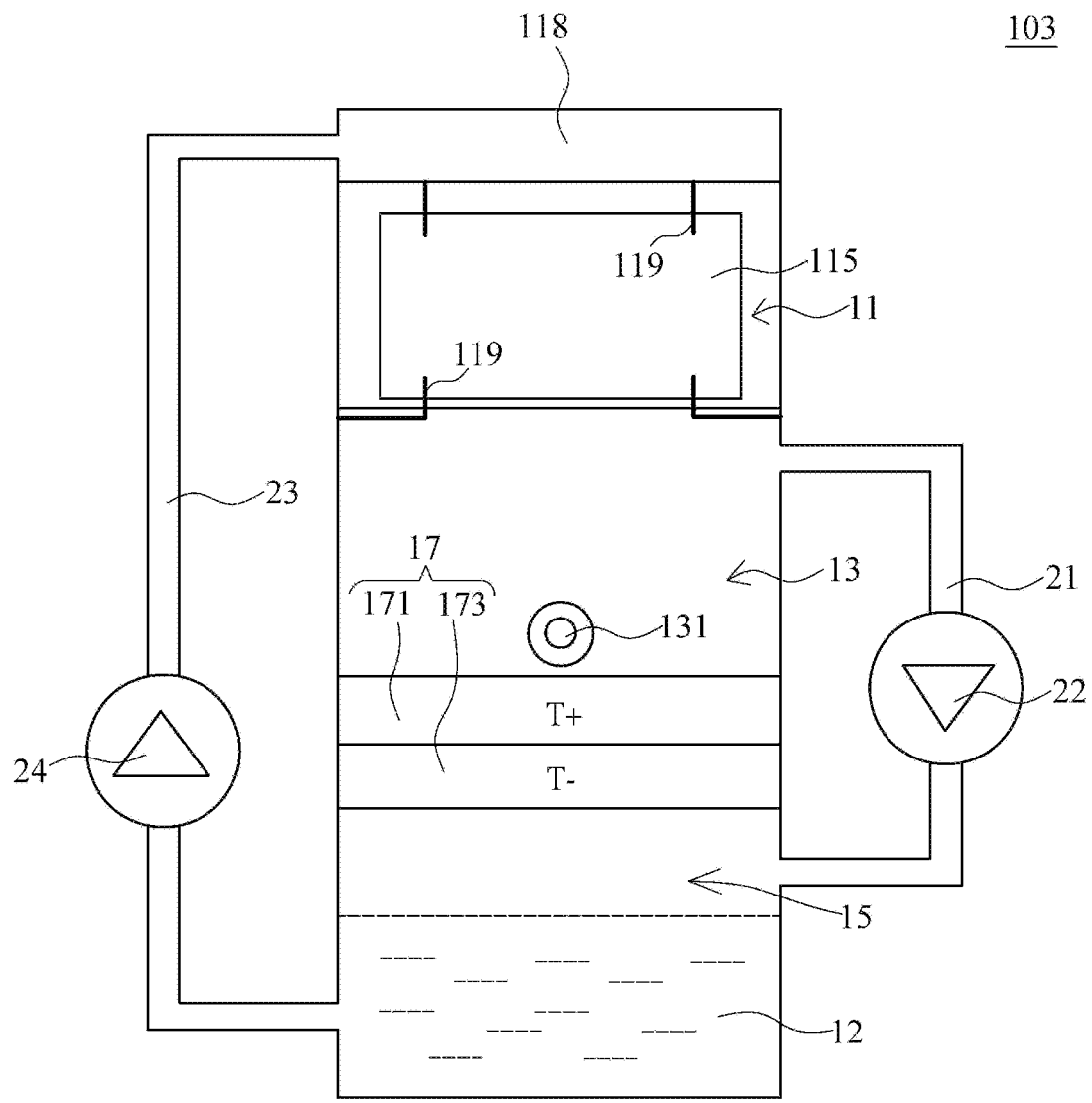
FIG. 6 is a block diagram of a portable extraction device according to the fourth embodiment of the present invention.

Referring to FIG. 6, there is shown a block diagram of a portable extraction device according to the fourth embodiment of this invention. As shown in FIG. 6, the vessel 115 of the portable extraction device 103 of the present invention will be designed as a disassemblable vessel that already contains the substance to be extracted. The vessel 115 is perforated on a top and bottom thereof. The perforations of the vessel 115 will be penetrated through by one or more punchers 119 when the vessel 115 is installed in the extractor 11. Furthermore, the portable extraction device 103 comprises a lid 118 that covers the vessel 115, equipped with punchers 119 at the bottom thereof, and interconnected with the second pipe 23. The liquefied extraction fluid 12 in the condenser 15 is continuously pumped by the second circulation pump 24 to the lid 118, and flows into the vessel 115 through the perforations between the lid 118 and the top of the vessel 115. Then, the extraction fluid will flow through the inside of the substance in the vessel 115 to dissolve the constituent from the substance. Afterwards, the extraction fluid including the constituent will drain down through the bottom perforations of the vessel 115 to enter the evaporator 13. The extraction fluid will be evaporated in the evaporator 13, recycled in the condenser 15, and re-enter the extractor 11 for next extraction. Besides, the constituent will remain in the evaporator 13.

Figure 7:
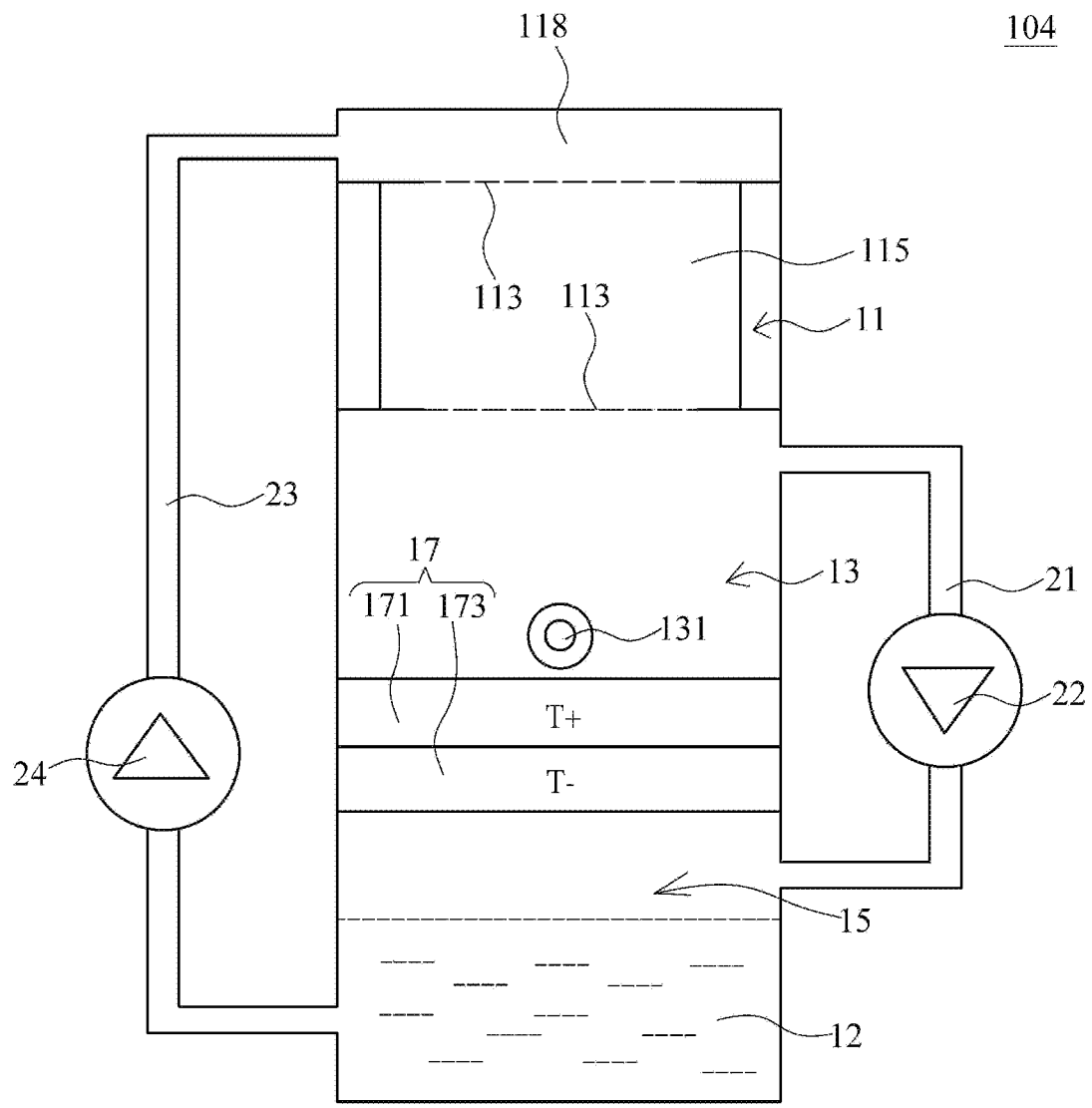
FIG. 7 is a block diagram of a portable extraction device according to the fifth embodiment of the present invention.

Referring to FIG. 7, there is shown a block diagram of a portable extraction device according to the fifth embodiment of this invention. As shown in FIGS. 6 and 7, the configurations of the portable extraction device 104 of the present embodiment are similar to the configurations of the portable extraction device 103 of the above embodiment, the difference between the two is that the vessel 115 of the above embodiment is provided at the top and bottom thereof with perforations that are able to be penetrated through by the punchers 119, respectively, while the vessel 115 of the present embodiment is provided at the top and bottom thereof with a mesh 113, respectively.

The liquefied extraction fluid 12 is continuously pumped by the second circulation pump 24 to the lid 118, and flows into the vessel 115 through the mesh openings of the mesh 113 between the lid 118 and the top of the vessel 115. Then, the extraction fluid will flow through the inside of the substance in the vessel 115 to dissolve the constituent from the substance. Afterwards, the extraction fluid including the constituent will drain down through the mesh openings of the bottom mesh 113 of the vessel 115 to enter the evaporator 13. The extraction fluid will be evaporated in the evaporator 13, recycled in the condenser 15, and re-enter the extractor 11 for next extraction. Besides, the constituent will remain in the evaporator 13.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A portable extraction device (100, 101, 102, 103, 104) for extracting at least one constituent from a substance by an extraction fluid, comprising:
- an extractor (11) for placing and mixing the substance and the extraction fluid, wherein the extraction fluid is a subcritical fluid, such that the constituent in the substance is dissolved into the extraction fluid under a predetermined pressure and a predetermined temperature;
- an evaporator (13), provided below the extractor (11), and interconnected to the extractor (11), wherein the evaporator (13) receives the extraction fluid including the constituent from the extractor (11), and heats the extraction fluid including the constituent so as to vaporize the extraction fluid and therefore separate the constituent from the vaporized extraction fluid; and
- a condenser (15), provided below the evaporator (13), connected to an upper part of the evaporator (13) via a first pipe (21), and connected to the extractor (11) via a second pipe (23), wherein the condenser (15) receives the vaporized extraction fluid from the evaporator (13) via the first pipe (21), liquefies the vaporized extraction fluid, and transmits the liquefied extraction fluid (12) to the extractor (11) via the second pipe (23);

wherein the extractor (11) comprises:
- a vessel (115), wherein the vessel (115) is removable and rotatable and comprises an inlet (116), and a plurality of openings (1131) on a bottom of the vessel (115); and
- a plurality of openings (1133) on a bottom of the extractor (11); and wherein when the inlet (116) is located in a first position (A) by the rotation of the vessel (115), the inlet (116) is aligned with the second pipe (23), the extraction fluid (12) enters the vessel (115) via the second pipe (23) and the inlet (116), and the openings (1131) of the vessel (115) and the openings (1133) of the extractor (11) are not aligned with each other and are in a closed state; and when the inlet (116) is located in a second position (B) by the rotation of the vessel (115), the inlet (116) is disconnected from the second pipe (23), the second pipe (23) is closed by a side wall of the vessel (115), and the openings (1131) of the vessel (115) and the openings (1133) of the extractor (11) are aligned with each other and are in an open state.

2. The portable extraction device according to claim 1, wherein the condenser (15) comprises a sight glass (151) for showing the level of the liquefied extraction fluid (12).

* * * * *